United States Patent [19]
Chumbley et al.

[11] B 4,013,480
[45] Mar. 22, 1977

[54] CELLULOSIC SIZING AGENTS

[75] Inventors: Lewis E. Chumbley; Lawrence L. Sams, II, both of Lake Jackson; Russell T. McFadden, Freeport; Juan Longoria, III, Lake Jackson, all of Tex.; Donald A. Tomalia, Midland, Mich.; Robert J. Thomas, Midland, Mich.; James W. Lalk, Shepherd, Mich.

[73] Assignee: The Dow Chemical Company, Midland, Mich.

[22] Filed: Jan. 10, 1974

[21] Appl. No.: 432,265

[44] Published under the second Trial Voluntary Protest Program on March 23, 1976 as document No. B 432,265.

Related U.S. Application Data

[63] Continuation-in-part of Ser. No. 180,234, Sept. 13, 1971, abandoned, Ser. No. 323,373, Jan. 15, 1973, abandoned, and Ser. No. 323,374, Jan. 15, 1973, abandoned.

[52] U.S. Cl. .......................... 106/213; 162/164 R; 162/175; 260/2 EN; 260/29.2 N
[51] Int. Cl.² .......................................... C08J 3/02
[58] Field of Search .................. 162/164, 168, 175; 106/213; 260/2 EN, 29.2 N, 9, 239 E; 117/154, 155 UA; 8/116.2, 116.3, 129; 252/312

[56] References Cited
UNITED STATES PATENTS

| | | | |
|---|---|---|---|
| 2,626,931 | 1/1953 | Bestian | 260/2 EN |
| 2,698,793 | 1/1955 | Landes et al. | 162/164 |
| 3,198,754 | 8/1965 | Ahlbrecht et al. | 260/239 E |
| 3,346,527 | 10/1967 | Lagally | 162/158 |
| 3,575,796 | 3/1971 | Brown et al. | 162/158 |
| 3,622,528 | 11/1971 | Langoria | 162/164 |

OTHER PUBLICATIONS
Dermer & Ham, "Ethylenimine and Other Aziridines" Academic Press, (1969), pp. 133, 160, 161.

*Primary Examiner*—Robert L. Lindsay, Jr.
*Assistant Examiner*—Peter Chin
*Attorney, Agent, or Firm*—David H. Fifield; L. Wayne White

[57] ABSTRACT

Novel cellulosic sizing agents are described. They are ring-opened aziridinyl homopolymers of

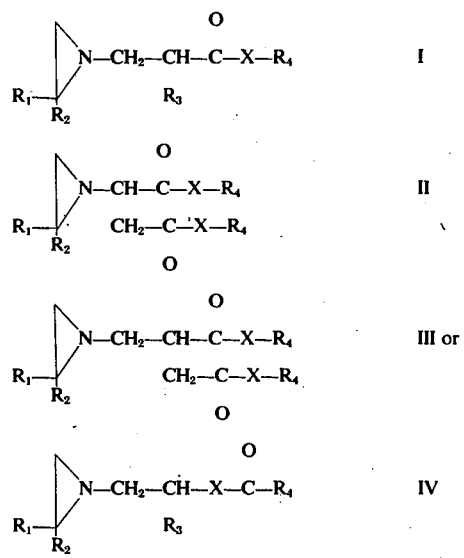

wherein $R_1$ and $R_2$ are hydrogen or lower alkyl; $R_3$ is hydrogen or methyl; $R_4$ is an organic hydrophobic group (e.g., $C_8-C_{24}$ alkyl radical); and X is oxygen or amido nitrogen. The above homopolymers can also be blended with cationic starch to form useful sizing compositions. These sizing agents are normally employed as aqueous emulsions. E.g., paper having excellent sizing properties was prepared from a paper pulp containing a mixture of cationic starch and poly[stearyl 3-(1-aziridinyl)propionate].

27 Claims, No Drawings

CELLULOSIC SIZING AGENTS

CROSS-REFERENCE TO RELATED APPLICATIONS

This application is a continuation-in-part of applicant's copending applications Ser. No. 180,234, filed Sept. 13, 1971; Ser. No. 323,373, filed Jan. 15, 1973; and Ser. No. 323,374, filed Jan. 15, 1973 all now abandoned.

BACKGROUND OF THE INVENTION

This invention pertains to novel cellulosic sizing agents and to an improved process for sizing cellulosics.

Cellulosics, such as paper, are often sized with various materials to impart water-resistance and resistance to aqueous solutions and dispersions, e.g., inks. This "water-resistance" is necessary in many instances to retain the strength of the cellulosic and to facilitate processing operations, such as printing, etc.

The term "cellulosic," as used herein, is meant to include paper, paperboard and other fibrous sheet-like or molded masses derived from wood, wood pulp, cotton, or other source of cellulose fibers. The term "cellulosic" also includes sheet-like or molded masses prepared from combinations of cellulosic and noncellulosic materials (e.g., polyamides, polyesters, polyacrylic acid resin fibers, and mineral fibers such as asbestos, glass, etc.). Thus, the term includes textiles, such as cotton-polyester blends.

Previous cellulosic sizing agents have generally been hydrophobic materials, such as rosin, fortified rosin, mixtures of rosin with waxes, etc. Their utility in most instances was limited by one or more factors, e.g., solubility, stability, adhesion to the cellulosic, pH dependence, etc. Their pH dependence was one of the more important limiting variables, particularly in sizing paper, since most were effective and operable only under acid conditions. A sizing agent for paper which may be used at neutral or alkaline pH values is very desirable since paper prepared under such conditions has greater strength, resistance to aging, etc., than paper prepared under acidic conditions, and, alkaline pigments such as calcium carbonate and alum can be used in the aqueous pulp slurry without adversely affecting the sizing agents or sized material.

In some instances, aziridinyl-based compounds have been used as cellulosic sizing agents.

One such sizing agent was described by G. H. Brown and M. M. Skoultchi in U.S. Pat. No. 3,575,796. They used an aqueous emulsion of certain monomeric N-substituted aziridines in sizing paper and paperboard products. Their aziridines were prepared by reacting ethylenimine (aziridine) with an α,β-ethylenically unsaturated compound, such as distearyl maleate, stearyl acrylate, etc. The sizing agents were typically dispersed in aqueous media with cationic starch, which functioned both as retention aid and a cationic emulsifier.

Other aziridinyl-based paper sizing agents are described in "Ethylenimine and Other Aziridines" by O. C. Dermer and G. E. Ham, Academic Press, N.Y. (1969), pp. 362-3.

In other instances, starch and starch derivatives have been used to impart sizing to cellulosics. For example, U.S. Pat. No. 3,107,294 illustrates the use of a cationic starch as a paper size.

SUMMARY OF THE INVENTION

It has now been discovered that (a) a ring-opened aziridinyl homopolymer of an aziridinyl monomer corresponding to the formula

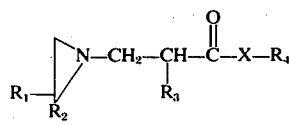   I

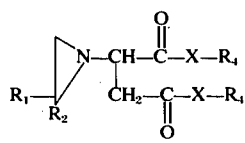   II

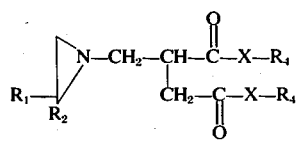   III or

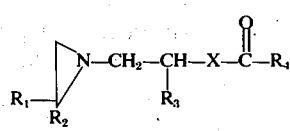   IV wherein $R_1$ and $R_2$ are each independently hydrogen or lower alkyl; $R_3$ is hydrogen or methyl; $R_4$ is an organic hydrophobic group; and X is oxygen or an amido nitrogen (—NH—), are extremely useful alone and in combination with (b) cationic starch as novel sizing agents for cellulosics. They can be used over a wide pH range (e.g., from about 4 to about 9 or so) and are particularly useful as neutral or alkaline sizing agents for paper. They are advantageously applied in emulsified form. In sizing paper, the subject sizing agents can be applied as an internal sizing agent by incorporation into the paper pulp or they can be applied as external sizes to preformed sheets.

THE CATIONIC STARCHES

Cationic starches are a known class of compounds which bear a plurality of amino groups (typically tertiary or quaternary amino groups). Any member of this known class is suitable for use herein. They are prepared from a variety of starches, such as corn starch, potato starch, sweet potato starch, wheat starch, soy bean starch, arrowroot starch, rice starch, tapioca starch, sago starch, etc. Illustrative of the class of cationic starches are those starches described in U.S. Pat. Nos.:

| | | |
|---|---|---|
| 2,813,093 | 3,066,032 | 3,219,518 |
| 2,876,217 | 3,067,152 | 3,219,519 |
| 2,935,436 | 3,101,330 | 3,243,426 |
| 2,946,705 | 3,102,064 | 3,354,034 |
| 3,017,294 | 3,167,468 | 3,422,087 | and British Pat. No. 1,022,810.

THE POLYMERS

The homopolymers of (I), (II), (III) and (IV) are cationic, water-insoluble solids at ambient temperatures and contain

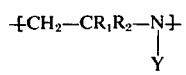

as the repeating unit along the backbone of the polymer; wherein Y is

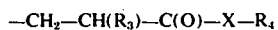

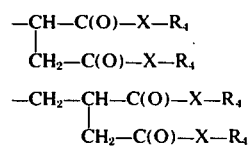

or

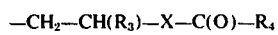

They are readily dispersed in water or aqueous media (e.g., aqueous ethanol, aqueous propanol, etc.) by conventional techniques, such as by rapid stirring in the presence of a cationic or nonionic dispersing agent (emulsifier). Such dispersing agents are well known in the art, as illustrated by the extensive review in "Detergents and Emulsifiers," John W. McCutcheon, Inc.; Morristown, N.Y. (1969).

The polymers are prepared from the monomeric aziridines represented by formulas (I), (II), (III) and (IV). Such aziridines are a known class of compounds; cf. "Ethylenimine and Other Aziridines" cited above.

In formulas (I)–(IV), $R_1$ and $R_2$ are each independently hydrogen or lower alkyl of from about 1 to 4 carbon atoms, such as methyl, ethyl, propyl and butyl. Preferably, $R_1$ is hydrogen and $R_2$ is hydrogen, methyl or ethyl. Most preferably, $R_1$ and $R_2$ are each hydrogen.

In formulas (I) and (IV), $R_3$ is hydrogen or methyl and is preferably hydrogen.

In formulas (I)–(IV), $R_4$ is an organic hydrophobic group. Typically, $R_4$ is a hydrocarbyl radical (such as alkyl, alkenyl, aryl, aralkyl, alkaryl, or the like) of from about 8 to about 24 carbon atoms or more (preferably from 16 to 20 carbon atoms). $R_4$ is preferably alkyl and is most preferably a linear alkyl of 17 carbon atoms in formula (IV) and 18 carbon atoms in formulas (I)–(III).

Also in formulas (I)–(IV), X is oxygen or amido nitrogen (—NH—) and is preferably oxygen.

Illustrative of the aziridines represented by formulas (I)–(IV) are those where X is oxygen, $R_1$ and $R_2$ are each hydrogen, $R_3$ is hydrogen and $R_4$ is octyl, dodecyl, pentadecyl, heptadecyl, stearyl, eicosyl, octenyl, 7-heptadecenyl, 8,10- and 8,11-heptadecadienyl, 8,11,14-heptadecatrienyl, naphthyl, phenethyl, phenylhexyl, p-butylbenzyl, p-octylphenyl, p-dodecylphenyl, 3,5-diethylphenyl; and the corresponding amides (X is —NH—); and the corresponding esters and amides wherein $R_1$ is hydrogen and $R_2$ is methyl; and the corresponding esters and amides wherein $R_1$ is hydrogen and $R_2$ is ethyl; and the corresponding esters and amides wherein $R_1$ and $R_2$ are each methyl; and the corresponding esters and amides wherein $R_1$ and $R_2$ are each butyl; and other like compounds.

The subject polymers are conveniently prepared by contacting in water or aqueous media a small but catalytic amount of a strong protic acid with compound (I), (II), (III) or (IV). E.g., amounts of from about 2 to 3 weight percent, based on weight of (I), (II), (III) or (IV), of protic acids such as acetic acid, p-toluenesulfonic acid, HCl, $H_2SO_4$, $H_3PO_4$, etc., are illustrative. The resulting polymeric product is usually obtained as an emulsion and may be used "as is" in the sizing applications. This is an important and unexpected result and yields an economic advantage over previous sizing agents which require a separate dispersion step.

The average particle size in such emulsions may suitably range up to about 20 microns but is preferably not more than about 2 microns and is most preferably about 1 micron or less.

The polymers of IV where $R_3$ is H may also be prepared by reacting

(or a lower alkyl ester thereof) with poly[1-(2-hydroxyethyl)aziridine]. Poly[1-(2-hydroxyethyl)-aziridine] is a known polymer having an average molecular weight of from a few hundred up to about 2,000 or more.

The subject polymers prepared by the methods above can vary in molecular weight from oligomeric materials having from about 2 to about 6 ring-opened aziridine units to higher polymers having up to about 20 to 30 ring-opened aziridine units in the backbone. The polymers prepared via the latter method, i.e., from poly[1-(2-hydroxyethyl)-aziridine] tend to be substantially linear, while the former method, i.e., acid catalyzed method, tends to produce predominantly a mixture of cyclic oligomers, with the cyclic dimer, trimer, tetramer and pentamer being the most common species. The structure of the polymer, i.e., cyclic or linear, is not critical for the purposes of our invention. The cyclic oligomers are generally preferred, however, based on their relative ease of preparation.

OTHER PARAMETERS

In applications as a sizing agent, the mixture of component (a), the ring-opened aziridinyl homopolymers of monomers (I)–(IV), and component (b), cationic starch, is employed in a weight ratio (b):(a) which may vary from about 0.5 to about 4, although best results are obtained at a weight ratio of from about 1 to about 2. A ratio higher than 4 can be used, of course, but little advantage is gained, and, at a ratio less than about 0.5, the sizing is not effective at conventional loadings (or amounts) of sizing.

The polymeric component (a) is readily blended with cationic starch component (b) by stirring or other suitable means. The order of mixing components (a) and (b) is not critical. They can be premixed and applied to the cellulosic as a combination, or, they can be applied separately. In most instances, we find it advantageous to apply an aqueous emulsion of the combination of (a) and (b) to the cellulosic to be sized. Generally, the sized cellulosic is heated to remove the solvent and promote chemical bonding. Temperatures of about 100° to about 120°C. for periods up to one hour are commonly used.

The amount of sizing agent (combination of (a) and (b)) can be varied to obtain some particular degree of water-resistance or sizing necessary in a given application. E.g., amounts up to about 25 pounds per ton of dry cellulosic may be used. Any nontrivial amount of the subject sizing agents will provide some sizing, but amounts of from about 2 to about 10 pounds per ton of dry pulp are preferred for preparing internally sized paper. Lesser amounts can be used with essentially equivalent results by applying the subject sizing agents to preformed paper or textiles.

The amount of polymeric sizing agent ((a) alone) can be varied to convenience, also depending upon the degree of sizing desired in the final product. Any nontrivial amount of the subject sizing agents will provide some sizing, but amounts of from about 5 to about 25 pounds per ton of pulp, dry pulp weight basis, are preferred for preparing internally sized paper. Lesser amounts can be used with essentially equivalent results by applying the subject polymers as an external size to preformed paper or to textiles.

DETAILED DESCRIPTION OF THE INVENTION

The following examples further illustrate the invention.

Sizing data was obtained on prepared handsheets using ink reflectance techniques. The ink reflectance test is a measure of the time in seconds required for ink to soak through the sized paper, so as to reduce the reflectance to 50% as measured by a Photoelectric Reflection Meter with a tristimulus filter on the photoelectric cell. The test was conducted by first fastening a 2 inch by 2 inch sample of the paper to be evaluated on top of the cell by means of a ring clamp paper holder. A black cavity was then placed on top of the paper holder, and the galvanometer was adjusted to 100 by means of the sensitivity controls. The black cavity was removed, and ink (Sheaffers Scrip No. 22, black) was poured on the exposed paper inside the ring clamp until the ink level was even with the top of the clamp. The percent reflectance was measured after 120 seconds of elapsed time (except where otherwise noted) or the elapsed time recorded at which the galvanometer read 50% of original reflectance value, whichever came first. The higher the percent reflectance, the better the sizing.

EXAMPLES 1–5: POLYMERIC SIZING AGENTS (COMPONENT (A) ALONE)

Example 1

A solution of 2-(1-aziridinyl)ethyl stearate (1.202 g.) in 20 ml. acetone was added with vigorous stirring to a prewarmed solution of p-toluenesulfonic acid (0.261 g.) in water (107 g.). The mixture was stirred for 5 minutes and filtered by gravity flow through filter paper (No. 42 Whatman). The emulsified poly[2-(1-aziridinyl) ethyl stearate] filtered easily through the paper. Aliquots of the emulsion were diluted with water to form 1% and 0.5% by weight, total weight basis, test samples. A first and second sheet of No. 42 Whatman filter paper were soaked by immersion in the 1% and 0.5% dispersion test samples, respectively. Both sheets were then warmed at 110°C. for 30 minutes in a forced air oven. Both sheets showed excellent sizing properties in terms of resistance to penetration by a water drop. The dispersion was stable at room temperatures for a period of 24 hours.

Example 2

In a substantially identical run to Example 1 the polymer emulsion was diluted with water to give 0.375% solids content. Handsheets were prepared by mixing aliquots of this emulsion into a Kraft pulp; the handsheets were cured for 30 minutes in a forced air oven at about 110°C. Sizing was evaluated by the ink reflectance test. The results are summarized in Table I below.

TABLE I

| Run No. | Loading (lbs./ton)* | Results (sec.)* |
| --- | --- | --- |
| 1 | 20 | 500(+) |
| 2 | 15 | 500(+) |
| 3 | 10 | 204 |
| 4 | 5 | 6 |

*Loading refers to amount of poly(2-(1-aziridinyl)ethyl stearate) per ton of dry pulp. The "Results" are reported in number of seconds to reach 50% reflectance.

Example 3

A mixture of 2-(1-aziridinyl)ethyl stearate (1.054 g.) and 1 ml. glacial acetic acid was diluted with 50 ml. water and heated at 60°C. with stirring until a uniform, white, cloudy, emulsion was obtained. More water was added to make the emulsion 0.375% in polymer solids. Handsheets were prepared using this emulsion in Kraft pulp; cured 30 minutes at 110°C. The results of the ink reflectance test are summarized in Table II below.

TABLE II

| Run No. | Loading (lbs./ton) | Results* |
| --- | --- | --- |
| 5 | 20 | 85 |
| 6 | 15 | 94 |
| 7 | 10 | 91 |
| 8 | 5 | 50% at 31 seconds |

*"Results" are reported in % reflectance after 500 seconds. The results were improved by aging the handsheets overnight in the oven at 110°C.

Example 4

Concentrated (37%) HCl (1 ml.) was mixed with 1 ml. of pyridine and the mixture added to 2-(1-aziridinyl)-ethyl stearate (0.998 g.). This mixture was diluted with 20 ml. of water and heated for a few minutes at 55°C. with stirring until a good emulsion was obtained. The emulsion was further diluted with water to 0.375% polymer solids and evaluated as above in Kraft pulp. The results of ink reflectance tests are summarized in Table III below.

TABLE III

| Run No. | Loading (lbs./ton) | Results (%)* |
| --- | --- | --- |
| 9 | 20 | 92 |
| 10 | 15 | 85 |
| 11 | 10 | 50 at 238 seconds |
| 12 | 5 | 50 at 25 seconds |

*"Results" are percent reflectance after 500 seconds.

Example 5

Increased activity as a sizing agent appears to relate to the particle size of the emulsion. Thus, the smaller the particle size, the greater the activity. The best activity was found for an emulsion prepared as follows:

Into a 500 ml. flask was placed 45 g. of 2-(1-aziridinyl)ethyl stearate and 6.75 g. of nonionic emulsifier (octylphenoxy polyethoxy ethanol - sold under the trade name "Triton X-100" by Rohm and Haas). These components were heated to 50°C.; 247.0 g. H₂O was added and the temperature raised to 50°C. and the system allowed to equilibrate. To this was added 1.5 ml. (1.785 g.) of 37% HCl (conc.) and a 5°C. exotherm was observed. The mixture was allowed to digest 15 minutes at that temperature and then cooled to room temperature. The product contained 15% active solids.

Handsheets were prepared containing various loadings of the polymer based on pulp solids. These were evaluated for reflectance as described. Results are tabulated below.

TABLE IV

| Run No. | Loading (lbs./ton) | Reflectance (%) |
|---|---|---|
| 13 | 5 | 90 |
| 14 | 4 | 80 |
| 15 | 3 | 50 at 46 seconds |

The emulsion prepared above contained about 90% of its particles with a 1 micron size, whereas the majority of the particles previously prepared (Examples 1–4) were of 2–5 micron size, with only about 10% of 1 micron size.

Similar results are obtained by using other cationic or nonionic dispersing agents to form the emulsions and/or by using other acids to catalyze the polymerization. Likewise, similar cellulosic sizing is obtained by replacing the polymer(s) of 2-(1-aziridinyl)ethyl stearate with, for example, polymer(s) of stearyl-3-(1-aziridinyl)propionate, stearyl 3-(1-aziridinyl)isobutyrate, distearyl 2-(1-aziridinyl) butanedioate, distearyl 2-(1-aziridinylmethyl)butanedioate, and 2-(1-aziridinyl)ethyl-, 2-(1-propyleniminyl)ethyl-, 2-(1-butyleniminyl)ethyl-, 2-[1-(2-butylaziridinyl)]ethyl-, 2-[1-(2,2-dimethylaziridinyl)]ethyl-, 2-[1-(2,2-dibutylaziridinyl)]ethyl-, and 1-methyl-2-(1-aziridinyl)ethyl- esters of octanoic acid, dodecanoic acid, palmitic acid, oleic acid, linoleic acid, linolenic acid, p-octylbenzoic acid, and p-dodecylbenzoic acid and the corresponding amides.

Similar sizing results are also obtained by using, in the above test methods, the emulsified reaction product of (c) stearic acid or methyl stearate with (a) poly[1-(2-hydroxyethyl)aziridine]. The ratio of (c) to (a) is such that substantially all of the hydroxyl groups on (a) are converted to stearate ester groups.

EXAMPLE 6: COMPARISON OF (A) AND (B) SIZING MIXTURE VS. POLYMERIC SIZING ALONE

Water (264.3 g.) was added to a stirred, pre-warmed (68°C.) mixture of (i) 2-(1-aziridinyl)ethyl stearate (30 g.) and (ii) Triton X-100 nonionic emulsifier (4.5 g.). The temperature of the mixture was raised to 68°C. and 1.2 g. of concentrated HCl (37%) added. The stirred mixture was maintained at 68°C. for 20–30 minutes and cooled to room temperature. The resulting emulsion (Emulsion A) was milky white in appearance and contained 10% polymeric solids, on a total weight basis. Emulsion particles sizes ranged from about 1 to about 5 microns in diameter.

Emulsion B was then prepared by diluting 3.75 g. of Emulsion A with 18.75 g. of a starch suspension. Said suspension was prepared by warming with stirring 4 g. of a cationic starch (sold under the trade name "Cato 8") in 96 g. of water at 90°–95°C. for 30 minutes. Emulsion B thus contained 0.375% polymeric solids and 0.75% cationic starch, total weight basis in each instance.

Emulsion B was thoroughly mixed, at various loadings, into an aqueous pulp slurry of a bleached sulfite softwood (0.5% solids, based on weight of dry pulp). Handsheets were prepared from the pulp mixtures via conventional techniques and cured for 30 minutes at 100°C. in a forced air, draft oven.

Sizing data was obtained on the handsheets using the ink reflectance technique. The results of a series of tests are summarized in Table V.

TABLE V

| Run No. | Loading (lbs./ton)* | Reflectance (%) |
|---|---|---|
| 16 | 6 | 97 |
| 17 | 5 | 93 |
| 18 | 4 | 82 |
| 19 | 3 | 50 at 25 seconds |
| 20 | 0 | — |

*By "Loading" is meant lbs. of the polymeric component, poly[2-(1-aziridinyl)ethyl stearate], per ton of dry pulp.

In the control run, Run 20, the ink soaked through immediately. In Runs 16–19, the ink beaded nicely on the handsheet in each instance.

Using similar procedures, Emulsion A (diluted with water to 0.375%) was incorporated into handsheets and evaluated as a sizing agent by ink reflectance techniques. Results of using polymer without starch are reported in Table V-A.

TABLE V-A

| Run No. | Loading (lbs./ton)* | Reflectance (%) |
|---|---|---|
| 21 | 10 | 86 |
| 22 | 9 | 84 |
| 23 | 8 | 78 |
| 24 | 7 | 50 at 17 seconds |

*Same basis as in Table V.

From this data is seen that the sizing efficiency of poly[2-(1-aziridinyl)ethyl stearate] is greatly enhanced by the presence of cationic starch.

OTHER CATIONIC STARCH-POLYMER SIZING AGENTS

Example 7

Water (247 g.) was added to a stirred, pre-warmed (50°C.) mixture of 2-(1-aziridinyl)ethyl stearate (45 g.) and 6.75 g. of a nonionic emulsifier ("Triton X-100"). The stirred mixture was warmed to 50°C. and 1.5 ml. of concentrated HCl (37%) added; during this addition, the temperature rose to 55°C. The mixture was stirred for 15 minutes and cooled to room temperature. The particles in the emulsified product were quite uniform and ranged in size up to about 2 microns although most of the particles were approximately 1 micron in diameter. This aqueous emulsion was diluted with water, and mixed with aqueous, pre-cooked cationic starch as in Example 6. Handsheets were likewise prepared and evaluated by the ink reflectance technique. Results are in Table VI.

TABLE VI

| Run No. | Loading (lbs./ton)* | Reflectance (%) |
|---|---|---|
| 25 | 5 | 90 |
| 26 | 4 | 80 |
| 27 | 3 | 50 at 46 seconds |

*Same basis as in Table V.

Example 8

A sample of poly[2-(1-aziridinyl)ethyl stearate] was prepared as in Example 6 except for the emulsifier, which was omitted in this instance. The resulting aqueous mixture was treated with ultrasonic waves to effect better dispersion (particle size less than 10 microns); mixed with aqueous, pre-cooked cationic starch; and the resulting emulsion mixed with a bleached sulfite softwood pulp as in Example 6. Handsheets were prepared from the pulp and tested for sizing by the ink reflectance technique. Results are summarized in Table VII.

TABLE VII

| Run No. | Loading (lbs./ton)* | Reflectance (%) |
|---|---|---|
| 28 | 8 | 98 |
| 29 | 7 | 97 |
| 30 | 6 | 96 |
| 31 | 5 | 75 |

*Same basis as in Table V.

Example 9

The experiments of Example 6 were essentially duplicated except for the cationic starch, which was varied in this instance. The results are summarized in Table VIII. The figures under "Loading" represent the pounds of poly[2-(1-aziridinyl)ethyl stearate] used per ton of dry pulp, as in Table V.

TABLE VIII

| Run No. | Starch* | Loading (lbs./ton) | Reflectance (%) |
|---|---|---|---|
| 32 | "Cato 8" | 4 | 50 at 113 seconds |
|  |  | 5 | 88 |
|  |  | 6 | 92 |
| 33 | "Q-Tac" | 4 | 50 at 101 seconds |
|  |  | 5 | 86 |
|  |  | 6 | 96 |
| 34 | "Electra" | 4 | 50 at 73 seconds |
|  |  | 5 | 85 |
| 35 | "Sta-Lok 400" | 4 | 50 at 101 seconds |
|  |  | 5 | 90 |
| 36 | "Aminoethylated Corn Starch" | 4 | 50 at 12 seconds |
|  |  | 5 | 56 |
|  |  | 6 | 89 |

*"Cato 8" is a cationic corn starch bearing tertiary amino groups, and is produced by National Starch. "Q-Tac" is produced by Corn Products and is a corn starch bearing quaternary amino groups. "Electra" is produced by Anheuser Busch and is an aminated corn starch. "Sta-Lok 400" is a potato starch bearing quaternary amino groups and is produced by A. E. Staley. THe "Aminoethylated Corn Starch" was prepared by reacting at 100°C. from 3–5% ethylenimine with corn starch and contained primary amino groups.

Handsheets prepared and tested as above with from 4–10 pounds of either "Cato 8" starch or an unmodified potato starch and no poly[2-(1-aziridinyl)ethyl stearate] showed essentially no sizing (50% reflectance in less than 5 seconds).

Example 10

Example 6 was essentially duplicated except for the amount of cationic starch, which was varied in this series of experiments. Results are in Table IX. Figures under the column "Wt. Ratio" represent the weight ratio of cationic starch ("Cato 8") to poly[2-(1-aziridinyl)ethyl stearate]. For example, a weight ratio of 0.5 means 1 part of starch and 2 parts by weight polymer.

TABLE IX

| Run No. | Wt. Ratio | Loading (lbs./ton)* | Reflectance (%) |
|---|---|---|---|
| 37 | 0.5 | 5 | 50 at 20 seconds |
|  |  | 10 | 97 |
|  |  | 15 | 90 |
| 38 | 1 | 5 | 50 at 12 seconds |
|  |  | 6 | 50 at 90 seconds |
|  |  | 7 | 85 |
|  |  | 8 | 88 |
| 39 | 2 | 5 | 50 at 30 seconds |
|  |  | 6 | 82 |
|  |  | 7 | 89 |
|  |  | 8 | 94 |
| 40 | 3 | 5 | 50 at 40 seconds |
|  |  | 6 | 80 |
|  |  | 7 | 90 |
|  |  | 8 | 97 |

*Same basis as in Table V.

Higher weight ratios of starch to polymer (e.g., up to 5 or 10 or more) can be used if desired but little advantage is realized. A weight ratio of from about 1 to about 2 is thus preferred for internal paper sizing.

OTHER CATIONIC STARCH-POLYMER SIZING AGENTS

Example 11

Poly[Stearyl 3-(1-Aziridinyl)Propionate]

Stearyl 3-(1-aziridinyl)propionate (10 g.), a nonionic emulsifier (1.5 g., "Triton X-100") and water (100 ml.) were placed in a flask and heated with vigorous stirring to 68°–70°C. after which 37% aqueous HCl (0.45 g.) was added. After 30 minutes of vigorous stirring at 68°–70°C., the mixture was an emulsion of poly[stearyl 3-(1-aziridinyl)propionate].

Analysis of the above emulsion indicated that the polymeric product was a mixture of linear and cyclic oligomers containing from 2 to about 6 units with the predominant species being the cyclic dimer, trimer and tetramer.

The emulsified polymer above was evaluated as a wet end addition paper size as follows: The emulsion was diluted with water to a final concentration of 0.25 weight percent of polymer, total weight basis. Equal volumes of this emulsion and a 0.5 weight percent aqueous solution of a cationic starch ("Cato 8" — cooked at 85°–90°C. for 20 minutes in water and cooled to room temperature) were blended with a bleached sulfite softwood pulp slurry having a Canadian Standard Freeness (CSF) of 400 and a consistency of 0.38% at pH 7.0. The amount of polymer and cationic starch was varied to give the loadings indicated in Table X. Handsheets were prepared from the pulp blends in a conventional manner by pressing and drying on the Nobel & Wood machine and curing the resulting handsheet for 30 minutes at 110°C. in a forced air oven. The cured sheets were then conditioned at 70°C. and 50% relative humidity for 24 hours.

Sizing data were obtained on the handsheets using the ink reflectance technique. The results of a series of tests were summarized in Table X.

TABLE X

| Run No. | Loading (lbs./ton)* | Reflectance (%) |
|---|---|---|
| 41 | 6 | 54 |
| 42 | 7 | 88 |
| 43 | 8 | 91 |
| 44 | 12 | 93 |

TABLE X-continued

| Run No. | Loading (lbs./ton)* | Reflectance (%) |
|---------|---------------------|-----------------|
| 45      | 20                  | 94              |

*Same basis as in Table V.

Example 12

Poly[Distearyl 2-(1-Aziridinyl)Butanedioate]

Using the procedure detailed in Example 11, a polymer of distearyl 2-(1-aziridinyl)butanedioate was prepared as an emulsion and used a wet end paper size. The reflectance test data on the handsheets is set forth in Table XI.

TABLE XI

| Run No. | Loading (lbs./ton)* | Reflectance (%) |
|---------|---------------------|-----------------|
| 46      | 8                   | 61              |
| 47      | 12                  | 90              |
| 48      | 20                  | 88              |

*Same basis as in Table V.

Example 13

Poly[Distearyl 2-(1-Aziridinylmethyl)Butanedioate]

In like manner poly[distearyl 2-(1-aziridinylmethyl)butanedioate] was prepared and evaluated as a wet end sizing agent. The reflectance data are given in Table XII.

TABLE XII

| Run No. | Loading (lbs./ton)* | Reflectance (%) |
|---------|---------------------|-----------------|
| 49      | 12                  | 62              |
| 50      | 20                  | 90              |

*Same basis as in Table V.

Similar sizing results are obtained by replacing the above polymers with, for example, the polymers of the 2-(1-aziridinyl)ethyl-, 2-(1-propylenimino)ethyl-, and 2-[1(2,2-dimethyl)aziridinyl]ethyl-esters (and amides) of octanoic acid, dodecanoic acid, palmitic acid, oleic acid, linoleic acid, linolenic acid, p-octylbenzoic acid, and p-dodecylbenzoic acid and other polymers described above.

Similar sizing results are also obtained by replacing the polymer(s) of 2-(1-aziridinyl)ethyl stearate in the above examples with the emulsified reaction product of (c) stearic acid or methyl stearate and (a) poly[1-(2-hydroxyethyl)aziridine]. The ratio of (c) to (a) is such that essentially all of the pendant hydroxyethyl groups along the polymer chain are converted to stearate ester groups.

We claim:

1. A mixture of (a) a ring-opened aziridinyl homopolymer of an aziridinyl monomer corresponding to the formula

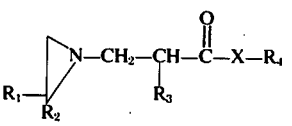

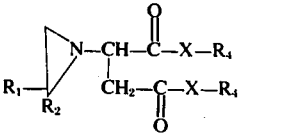

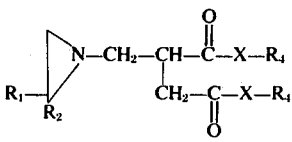

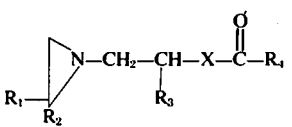

and (b) cationic starch,
wherein: X is oxygen or amido nitrogen, $R_1$ and $R_2$ are hydrogen or lower alkyl of from 1 to 4 carbon atoms, $R_3$ is hydrogen or methyl and $R_4$ is an organic hydrophobic group.

2. The mixture defined in claim 1 wherein $R_1$ is hydrogen and $R_2$ is hydrogen, methyl or ethyl.

3. The mixture defined in claim 2 wherein $R_2$ is hydrogen.

4. The mixture defined in claim 1 wherein X is oxygen.

5. The mixture defined in claim 1 wherein $R_4$ is hydrocarbyl of from about 8 to about 24 carbon atoms.

6. The mixture defined in claim 5 wherein $R_4$ is alkyl of from 16 to 20 carbon atoms.

7. The mixture defined in claim 6 wherein $R_3$ is hydrogen.

8. The mixture defined in claim 6 wherein $R_4$ is a straight chain alkyl of 18 carbon atoms; X is oxygen and $R_1$ and $R_2$ are each hydrogen and (a) is a polymer of (I).

9. The mixture defined in claim 6 wherein $R_4$ is a straight chain alkyl of 17 carbon atoms; X is oxygen; $R_1$ and $R_2$ are each hydrogen and (a) is a polymer of (IV).

10. The mixture defined in claim 1 wherein the weight ratio of (b) to (a) is from about 0.5 to about 4.

11. The mixture defined in claim 10 wherein said ratio is from about 1 to about 2.

12. An aqueous emulsion of the mixture defined in claim 1.

13. The mixture defined in claim 1 wherein the homopolymer (a) has from 2 to about 30 ring-opened aziridine units in the backbone.

14. The mixture defined in claim 1 wherein the homopolymer (a) is predominantly a mixture of cyclic oligomers.

15. In the process of sizing cellulosics, the improvement consisting of applying to a cellulosic, in an amount sufficient to size same, a sizing agent comprising a ring-opened aziridinyl homopolymer of an aziridinyl monomer corresponding to the formula

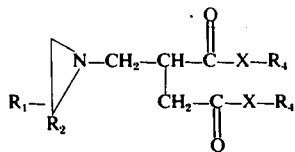

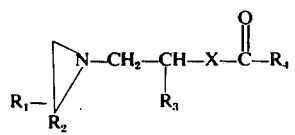

wherein: X is oxygen or amido nitrogen, $R_1$ and $R_2$ are hydrogen or lower alkyl of from 1 to 4 carbon atoms, $R_3$ is hydrogen or methyl and $R_4$ is an organic hydrophobic group.

16. The process of claim 15 wherein the sizing agent further comprises cationic starch.

17. A cellulosic sizing composition comprising the mixture defined in claim 1.

18. A cellulosic sized by the process described in claim 16.

19. Paper or paperboard sized by the process described in claim 16.

20. The improvement defined in claim 19 wherein said cellulosic is paper or paper pulp.

21. The improvement defined in claim 20 wherein said cellulosic is paper pulp; and wherein a mixture of said homopolymer and said cationic starch is admixed with said pulp in amounts of up to about 25 pounds per ton of dry pulp.

22. The improvement defined in claim 21 wherein said mixture is present in amounts of from about 2 to about 10 pounds per ton of dry pulp.

23. The process of claim 18 wherein said cellulosic is paper or paper pulp.

24. The process of claim 23 wherein said cellulosic is paper pulp and wherein said homopolymer is admixed with said pulp in amounts of from about 5 to about 25 pounds per ton of dry pulp.

25. The process of claim 18 wherein said homopolymer is a cyclic oligomer having from 2 to about 6 ring-opened units of (IV).

26. The process of claim 25 wherein $R_1$, $R_2$ and $R_3$ are hydrogen, $R_4$ is alkyl of from about 8 to about 24 carbon atoms, and X is oxygen.

27. The process of claim 18 wherein $R_1$ and $R_2$ are hydrogen, $R_4$ is alkyl of from about 8 to about 24 carbon atoms and X is oxygen.

* * * * *

UNITED STATES PATENT AND TRADEMARK OFFICE
CERTIFICATE OF CORRECTION

PATENT NO. : 4,013,480

DATED : March 22, 1977

INVENTOR(S) : Lewis E. Chumbley; Lawrence L. Sams, II; Russell T. McFadden; Juan Longoria, III; Donald A. Tomalia; Robert J. Thomas; James W. Lalk It is certified that error appears in the above-identified patent and that said Letters Patent are hereby corrected as shown below:

In the Abstract, line 3, the formula should read:

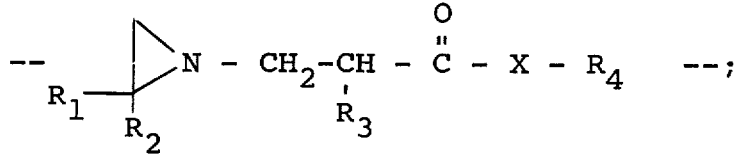

In the Abstract, line 4, the formula should read:

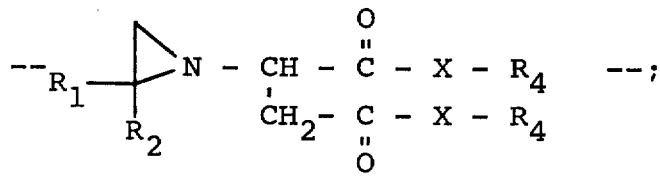

In the Abstract, line 5, the formula should read:

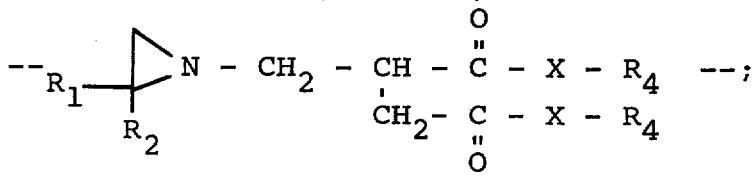

In the Abstract, line 6, the formula should read:

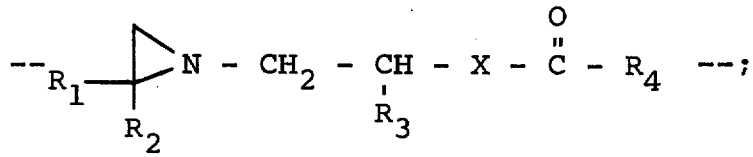

UNITED STATES PATENT AND TRADEMARK OFFICE
CERTIFICATE OF CORRECTION

PATENT NO. : 4,013,480
DATED : March 22, 1977
INVENTOR(S) : Lewis E. Chumbley; Lawrence L. Sams, II; Russell T. McFadden; Juan Longoria, III; Donald A. Tomalia; Robert J. Thomas; James W. Lalk It is certified that error appears in the above-identified patent and that said Letters Patent are hereby corrected as shown below:

Column 1, line 7, "cant's" should read --cants'--;

Column 1, line 67, "3,107,294" should read --3,017,294--;

Column 2, line 10, the formula should read:

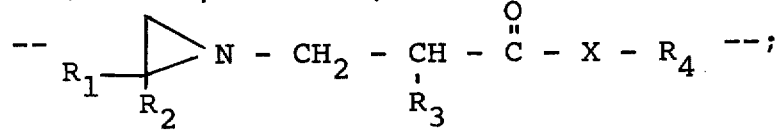

Column 2, line 15, the formula should read:

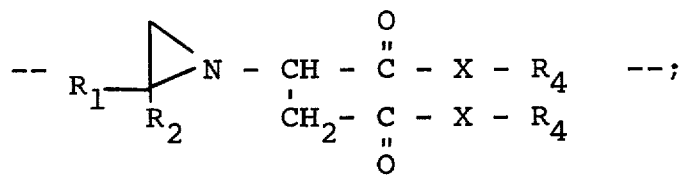

Column 2, line 20, the formula should read:

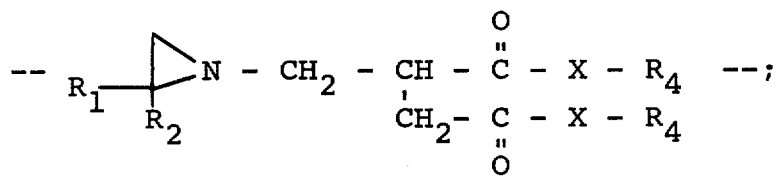

UNITED STATES PATENT AND TRADEMARK OFFICE
CERTIFICATE OF CORRECTION

Page 3 of 6

PATENT NO. : 4,013,480
DATED : March 22, 1977
INVENTOR(S) : Lewis E. Chumbley; Lawrence L. Sams, II; Russell T. McFadden; Juan Longoria, III; Donald A. Tomalia; Robert J. Thomas; James W. Lalk It is certified that error appears in the above-identified patent and that said Letters Patent are hereby corrected as shown below:

Column 2, line 25, the formula should read:

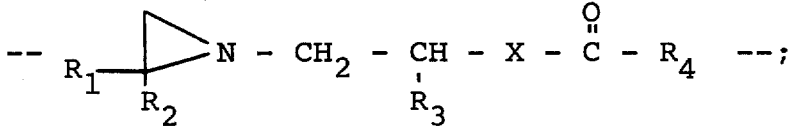

Column 3, line 34, delete "about";

Column 4, line 1, delete "about";

Column 4, line 28, delete the first occurring "about";

Column 7, line 58, delete "particles" and insert --particle--;

Column 9, line 49, delete "THe" and insert --The--;

Column 11, line 39, delete "2-[1(2,2-dimethyl)aziridinyl]ethyl-esters" and insert --2-[1-(2,2-dimethyl)aziridinyl]ethyl-esters--;

Column 11, line 60, the formula should read:

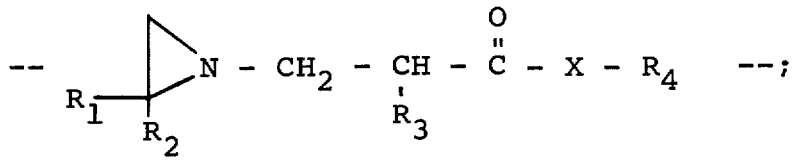

UNITED STATES PATENT AND TRADEMARK OFFICE
CERTIFICATE OF CORRECTION

PATENT NO. : 4,013,480                              Page 4 of 6
DATED     : March 22, 1977
INVENTOR(S) : Lewis E. Chumbley; Lawrence L. Sams, II; Russell T. McFadden; Juan Longoria, III; Donald A. Tomalia; Robert J. Thomas; James W. Lalk It is certified that error appears in the above-identified patent and that said Letters Patent are hereby corrected as shown below:

Column 11, line 65, the formula should read:

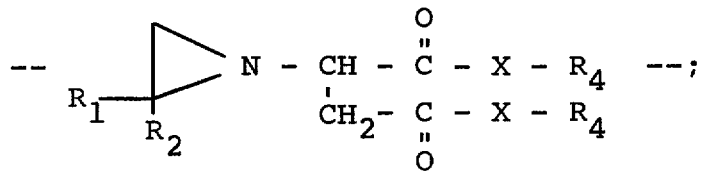

Column 12, line 4, the formula should read:

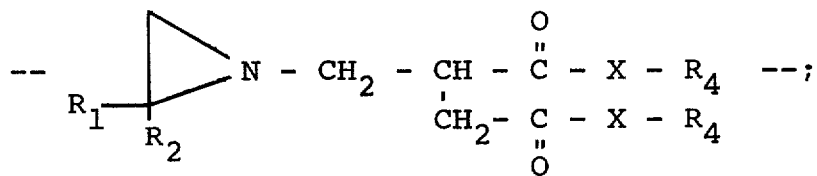

Column 12, line 10, the formula should read:

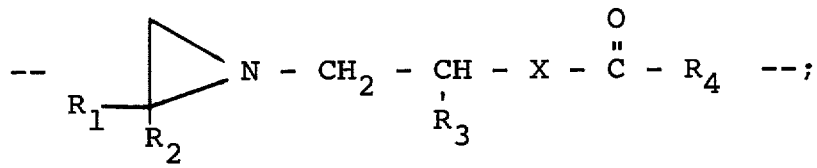

UNITED STATES PATENT AND TRADEMARK OFFICE
CERTIFICATE OF CORRECTION

PATENT NO. : 4,013,480

DATED : March 22, 1977

INVENTOR(S) : Lewis E. Chumbley; Lawrence L. Sams, II; Russell T. McFadden; Juan Longoria, III; Donald A. Tomalia; Robert J. Thomas; James W. Lalk It is certified that error appears in the above-identified patent and that said Letters Patent are hereby corrected as shown below:

Column 12, line 60, the formula should read:

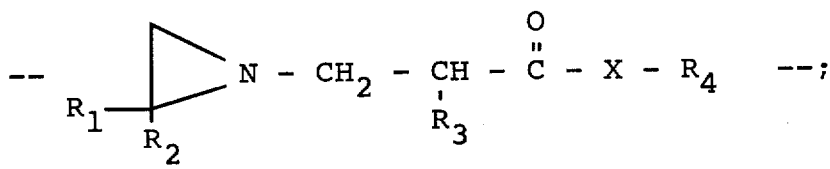

Column 12, line 65, the formula should read:

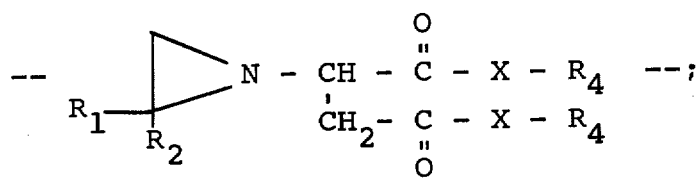

Column 13, line 3, the formula should read:

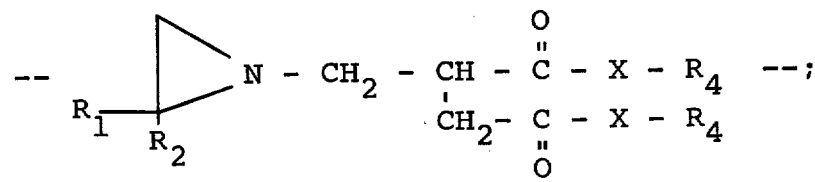

UNITED STATES PATENT AND TRADEMARK OFFICE
CERTIFICATE OF CORRECTION

PATENT NO. : 4,013,480
DATED : March 22, 1977
INVENTOR(S) : Lewis E. Chumbley; Lawrence L. Sams, II; Russell T. McFadden; Juan Longoria, III; Donald A. Tomalia; Robert J. Thomas; James W. Lalk It is certified that error appears in the above-identified patent and that said Letters Patent are hereby corrected as shown below:

Column 13, line 10, the formula should read:

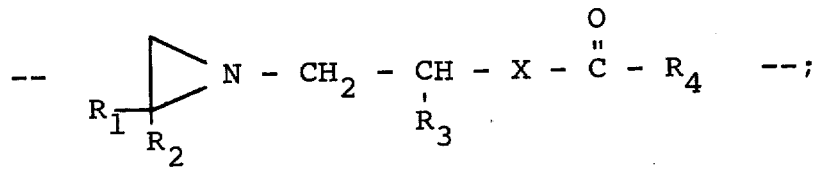

Column 14, line 1, delete "19" and insert --16--;

Column 14, line 11, delete "18" and insert --15--;

Column 14, line 17, delete "18" and insert --15--;

Column 14, line 23, delete "18" and insert --15--.

Signed and Sealed this nineteenth Day of July 1977

[SEAL]

Attest:

RUTH C. MASON
Attesting Officer

C. MARSHALL DANN
Commissioner of Patents and Trademarks